(12) United States Patent
Kim et al.

(10) Patent No.: US 8,918,276 B2
(45) Date of Patent: Dec. 23, 2014

(54) APPARATUS AND METHOD FOR INTEGRATED POSITIONING

(75) Inventors: Eung Sun Kim, Suwon-si (KR); Do Hyung Park, Seoul (KR); Yoon Chae Cheong, Seongsam-si (KR); Ki Ho Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/368,619

(22) Filed: Feb. 8, 2012

(65) Prior Publication Data

US 2012/0203451 A1 Aug. 9, 2012

(30) Foreign Application Priority Data

Feb. 9, 2011 (KR) .................. 10-2011-0011445

(51) Int. Cl.
| | | |
|---|---|---|
| G01S 5/04 | (2006.01) | |
| G01S 5/02 | (2010.01) | |
| G01C 21/20 | (2006.01) | |
| G01S 19/48 | (2010.01) | |
| G01C 21/16 | (2006.01) | |

(52) U.S. Cl.
CPC ............. *G01S 5/0263* (2013.01); *G01S 5/0236* (2013.01); *G01C 21/206* (2013.01); *G01S 19/48* (2013.01); *G01C 21/165* (2013.01)
USPC .......................................... 701/408; 342/450

(58) Field of Classification Search
None
See application file for complete search history.

(56) References Cited

U.S. PATENT DOCUMENTS

| | | | |
|---|---|---|---|
| 2002/0008661 A1 | 1/2002 | McCall et al. | |
| 2006/0258365 A1* | 11/2006 | Cha et al. | 455/456.1 |
| 2006/0267833 A1* | 11/2006 | Langford et al. | 342/174 |
| 2008/0158052 A1 | 7/2008 | Chen et al. | |
| 2008/0252517 A1* | 10/2008 | Fuchs et al. | 342/357.1 |
| 2008/0254916 A1* | 10/2008 | Kim et al. | 473/407 |
| 2009/0177385 A1* | 7/2009 | Matas et al. | 701/209 |
| 2009/0192709 A1 | 7/2009 | Yonker et al. | |
| 2010/0324813 A1* | 12/2010 | Sundararajan et al. | 701/208 |
| 2011/0087688 A1* | 4/2011 | Midtun et al. | 707/769 |
| 2011/0257920 A1* | 10/2011 | Onda et al. | 702/94 |
| 2012/0214509 A1* | 8/2012 | Levin et al. | 455/456.1 |
| 2013/0038490 A1* | 2/2013 | Garcia | 342/451 |
| 2013/0174072 A9* | 7/2013 | Nielsen et al. | 715/771 |

FOREIGN PATENT DOCUMENTS

| | | |
|---|---|---|
| JP | 2002-318272 | 10/2002 |
| JP | 2008-215924 | 9/2008 |
| JP | 2008-309797 | 12/2008 |
| JP | 2009-229204 | 10/2009 |
| KR | 10-2009-0008960 A | 1/2009 |
| KR | 10-2009-0022829 A | 3/2009 |
| KR | 10-2009-0061898 A | 6/2009 |
| WO | WO 2005029902 A1 * | 3/2005 |

* cited by examiner

*Primary Examiner* — Behrang Badii
*Assistant Examiner* — Demetra Smith-Stewart
(74) *Attorney, Agent, or Firm* — NSIP Law (57) ABSTRACT

Provided is an apparatus and method associated with a location based service, and an apparatus for integrated positioning that may sense positioning-associated information that is in proximity to a user. The apparatus may hierarchically classify the sensed positioning-associated information into multiple categories of accuracy based on a predetermined criterion, and estimate the location of the user in order of low accuracy information to more precise accuracy information.

26 Claims, 5 Drawing Sheets

APPARATUS AND METHOD FOR INTEGRATED POSITIONING

CROSS-REFERENCE TO RELATED APPLICATION(S)

This application claims the benefit under 35 U.S.C. §119(a) of Korean Patent Application No. 10-2011-0011445, filed on Feb. 9, 2011, in the Korean Intellectual Property Office, the entire disclosure of which is incorporated herein by reference for all purposes.

BACKGROUND

1. Field

The following description relates to an apparatus and method associated with a location based service.

2. Description of Related Art

A location based service may be provided on the premise that a location of a user using the location based service is recognizable and a location of a target to be searched by the user is recognizable.

An example of a scheme for recognizing a location of a user may include using a wireless signal, using a characteristic of the terrestrial magnetism, using an ultrasonic wave and laser, and the like. However, a positioning technology available to a user may vary based on a characteristic of a place in which the user is located or a change of an environment in proximity to the user. An accuracy provided by each positioning technology may vary.

Thus, a location of a user may be difficult to estimate accurately based on a single positioning technology in various environments where the user may be located. In addition, an estimation based on the single positioning technology may cause an excessive initialization time, thereby increasing an error in a location. Here, the initialization is the amount of time it takes for an initial recognition of a location of a user.

SUMMARY

In one general aspect, there is provided an apparatus for integrated positioning, including a positioning information sensing unit configured to sense positioning-associated information that is in proximity to a user, a classification unit configured to classify the sensed positioning-associated information into low accuracy information, medium accuracy information, and precise accuracy information based on a predetermined criterion, and a location estimating unit configured to estimate the location of the user in order of the low accuracy information, the medium accuracy information, and the precise accuracy information.

The low accuracy information may provide a location accuracy of an average of an X meter radius, the medium accuracy information may provide a location accuracy of an average of a Y meter radius, the precise accuracy information may provide a location accuracy of an average of a Z meter radius, and a value of X is greater than a value of Y, and the value of Y is greater than a value of Z.

The location estimating unit may estimate a first location of the user based on the low accuracy information, estimate a second location of the user based on the medium accuracy information within an area of the low accuracy information, and estimate a third location of the user based on the precise accuracy information within an area of the medium accuracy information.

The location estimating unit may include an accuracy calculator configured to calculate an accuracy of the estimated third location of the user, and a cooperative positioning determining unit configured to determine whether a cooperative positioning is to be performed with a relative positioning device based on the calculated accuracy.

The cooperative positioning determining unit may determine whether to perform the cooperative positioning based on the precise accuracy information and relative location information, by activating the relative positioning device when an average interval of the calculated accuracy is at least Z meters.

The cooperative positioning determining unit may determine whether to perform the cooperative positioning based on the precise accuracy information and relative location information, by activating the relative positioning device when a predetermined target is located within a relative region of the relative positioning device.

The cooperative positioning determining unit may determine to perform the cooperative positioning based on the precise accuracy information and relative location information, by continuously activating the relative positioning device.

The relative positioning device may measure a movement direction and a movement distance of a terminal using an inertial sensor of the terminal.

The relative positioning device may measure a relative distance and direction from a terminal to a predetermined target.

The apparatus may further include a cooperative positioning performing unit configured to estimate the location of the user based on the precise accuracy information and relative location information measured from a relative positioning device.

The positioning-associated information may include map information indicating a location of an access point (AP) used for measuring the location of the user or a location of a sensor for sensing a radio frequency (RF) signal.

The positioning-associated information may include geomagnetic-associated map information indicating geomagnetic-associated information of a building where the user is located.

The apparatus may further include a location updating unit configured to update a location of a user in motion, based on the positioning-associated information within a predetermined discovery range centered on the estimated location of the user, in response to an estimation of the location of the user.

In another general aspect, there is provided a method for integrated positioning, including sensing positioning-associated information that is in proximity to a user, classifying the sensed positioning-associated information into low accuracy information, medium accuracy information, and precise accuracy information based on a predetermined criterion, and estimating the location of the user in order of the low accuracy information, the medium accuracy information, and the precise accuracy information.

The low accuracy information may provide a location accuracy of an average of an X meter radius, the medium accuracy information may provide a location accuracy of an average of a Y meter radius, the precise accuracy information may provide a location accuracy of an average of a Z meter radius, and a value of X is greater than a value of Y, and the value of Y is greater than a value of Z.

The estimating may include estimating a first location of the user based on the low accuracy information, estimating a second location of the user based on the medium accuracy information within an area of the low accuracy information, and estimating a third location of the user based on the precise accuracy information within an area of the medium accuracy information.

The estimating may include calculating an accuracy of the estimated third location of the user, and determining whether a cooperative positioning is to be performed with a relative positioning device based on the calculated accuracy.

The determining may include determining whether to perform the cooperative positioning based on the precise accuracy information and relative location information, by activating the relative positioning device when an average interval of the calculated accuracy is at least Y meters.

The determining may include determining whether to perform the cooperative positioning based on the precise accuracy information and relative location information, by activating the relative positioning device when a predetermined target is located within a relative region of the relative positioning device.

The determining may include determining to perform the cooperative positioning based on the precise accuracy information and relative location information by continuously activating the relative positioning device.

The method may further include estimating the location of the user based on the precise accuracy information and relative location information measured from the relative positioning device.

The method may further include updating a location of a user in motion, based on the positioning-associated information within a predetermined discovery range centered on the estimated location of the user, in response to an estimation of the location of the user.

In another aspect, there is provided an apparatus for integrated positioning, the apparatus including a positioning information sensing unit configured to sense positioning-associated information that is in proximity to a user, a classification unit configured to classify the sensed positioning-associated information into a plurality of accuracy information based on a predetermined criterion, and a location estimating unit configured to estimate the location of the user based on the plurality of accuracy information.

The location estimating unit may be further configured to estimate the location of the user based on increasing accuracy of the plurality of accuracy information.

The plurality of accuracy information may include a first accuracy information and a second accuracy information having a different accuracy than the first accuracy information.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

Figure 1:
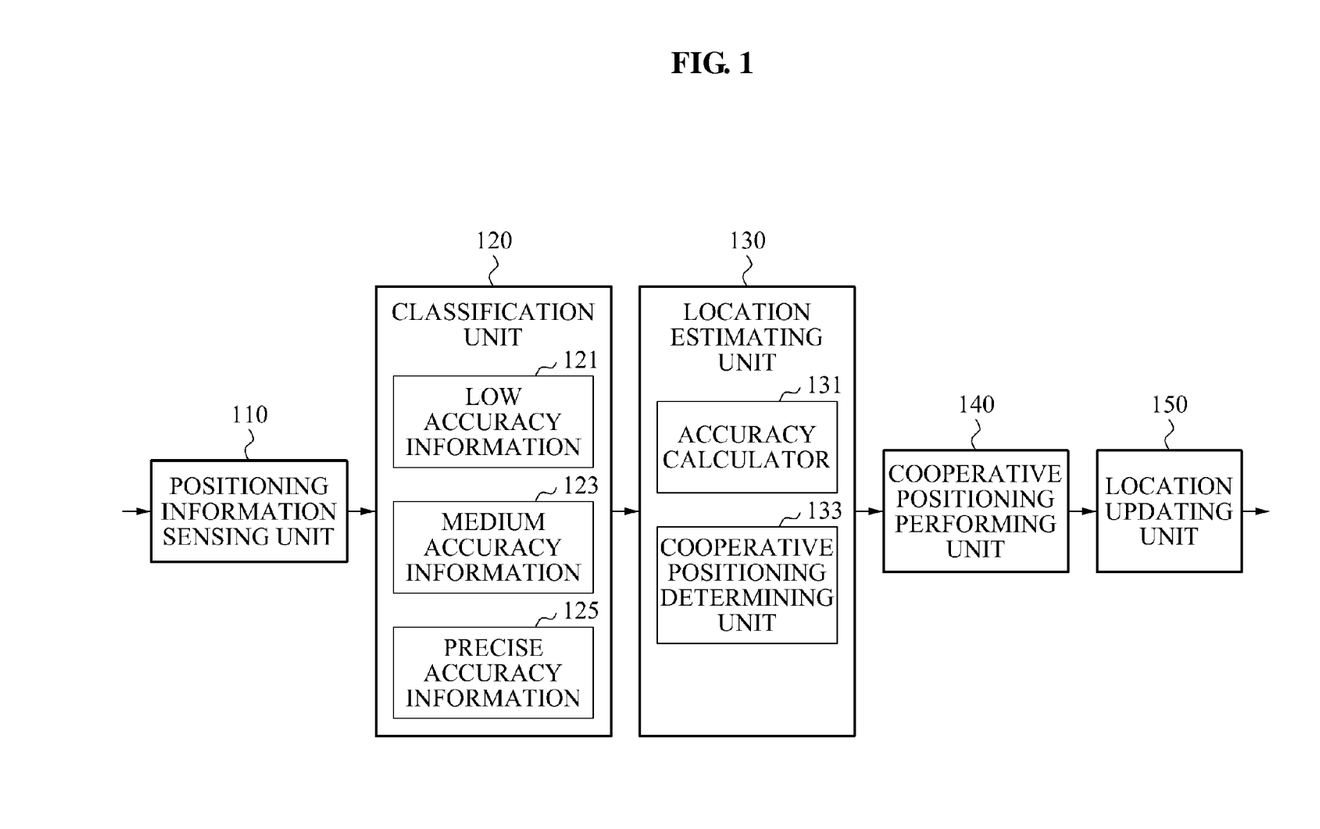
FIG. 1 is a diagram illustrating an example of an apparatus for integrated positioning.

FIG. 1 illustrates an example of an apparatus for integrated positioning.

Referring to FIG. 1, the apparatus for integrated positioning (hereinafter referred to as apparatus) includes a positioning information sensing unit 110, a classification unit 120, a location estimating unit 130, a cooperative positioning performing unit 140, and a location updating unit 150. In various embodiments, one or more of the a positioning information sensing unit 110, the classification unit 120, the location estimating unit 130, the cooperative positioning performing unit 140, and the location updating unit 150 may be omitted from the apparatus.

The apparatus may be, or may be included in a terminal such as a computer, a tablet, a phone, a Global Positioning System (GPS), and the like.

The positioning information sensing unit 110 may sense positioning-associated information that is in proximity to a user to estimate a location of the user. For example, the positioning information sensing unit 110 may sense information associated with a Wireless Fidelity (Wi-Fi) usage area, a Global Positioning System (GPS) usage area, a BLUETOOTH® usage area, a low power communication usage area, and the like which are in proximity to a user. The positioning information sensing unit 110 may receive positioning information from an external database. For example, the positioning information sensing unit 110 may receive positioning-associated information with respect to an area in which a user is located.

As an example, the positioning-associated information may include map information that indicates a location of an access point (AP) that is used for measuring the location of the user or a location of a sensor for sensing a radio frequency (RF) signal.

As another example, the positioning-associated information may include geomagnetic-associated map information indicating geomagnetic-associated information of a building in which the user is located. The apparatus for integrated positioning may estimate the location of the user using a regional characteristic in which a terrestrial magnetism may be distorted, for example, by a steel frame of a building, and the like.

The positioning-associated information may include information about an area in which a predetermined positioning technology is used.

The classification unit 120 may classify the sensed positioning-associated information based on accuracy. For example, the classification unit 120 may classify the sensed information into low accuracy information 121, medium accuracy information 123, and precise accuracy information 125 based on one or more predetermined criterion. The predetermined criterion may be determined based on a wireless coverage of a sensed positioning technology. As another example, the predetermined criterion may be determined based on an accuracy of the sensed positioning technology. Here, the accuracy indicates an error range between the estimated location of the user and an actual location of the user. In this example, the classification is into three categories of accuracy. However, the number of categories of accuracy is not limited thereto. For example, the classification unit may classify sensed data into two categories such as lower accuracy information and more precise accuracy information. As another example, the classification unit may classify the sensed data into at least four categories of accuracy.

For example, the low accuracy information 121 may provide a location accuracy of an average within an X meter radius, the medium accuracy information 123 may provide a location accuracy of an average within a Y meter radius, and the precise accuracy information 125 may provide a location accuracy of an average within a Z meter radius, where a value of X is greater than a value of Y, and a value of Y is greater than a value of Z. While the terms "low," "medium," and "precise" are used as examples to describe the categories of accuracy information, the terms should not be construed as limiting in scope. For example, the terms are merely used to illustrate that the low accuracy information may have a greater error range than the medium accuracy information, and the medium accuracy information may have a greater error range than the precise accuracy information.

The classification unit 120 may hierarchically classify the positioning-associated information based on a predetermined criterion. For example, if the precise accuracy information 125 using a high accuracy is initially estimated, an excessive amount of time for estimating a location may be taken, and an error may increase as the user moves during the period of estimation. The classification unit 120 may hierarchically classify the positioning-associated information to enable a positioning technology having a relatively poor accuracy to be used for initially estimating the location of the user in order to decrease error.

The location estimating unit 130 may estimate the location of the user using the classified positioning-associated information, for example, in order of the low accuracy information 121, the medium accuracy information 123, and the precise accuracy information 125 among pieces of the classified positioning-associated information.

The location estimating unit 130 may estimate a first location of the user based on the low accuracy information 121. The location estimating unit 130 may estimate a second location of the user based on the medium accuracy information 123 within an area in which the location estimating unit provides the low accuracy information 121. The location estimating unit 130 may estimate a third location of the user based on the precise accuracy information 125 within an area in which the location estimating unit provides the medium accuracy information 123.

In this example, an error between the actual location of the user and the estimated second location of the user may be less than an error between the actual location of the user and the estimated first location of the user because the medium accuracy information 123 may provide more accuracy than an accuracy provided by the low accuracy information 121. An error between the actual location of the user and the estimated third location of the user may be less than an error between the actual location of the user and the estimated second location of the user because the precise accuracy information 125 may provide more accuracy than an accuracy provided by the medium accuracy information 123. In this example, the third location of the user corresponds to a location of the user that has the highest estimated accuracy.

By hierarchically estimating a location of the user, the location estimating unit 130 may more rapidly and accurately estimate the location of the user.

The location estimating unit 130 may estimate the third location as a current location of the user, for example, when an accuracy of the estimated third location of the user is greater than or equal to a predetermined value based on the precise accuracy information 125.

Referring to FIG. 1, the location estimating unit 130 includes an accuracy calculator 131 and a cooperative positioning determining unit 133. The location estimating unit 130 may use the accuracy calculator 131 and the cooperative positioning determining unit 133 to enhance an accuracy of the estimated location of the user.

For example, the accuracy calculator 131 may calculate an accuracy of the third location of the user estimated by the location estimating unit 130 to enhance an accuracy by performing a cooperative positioning, when the accuracy of the third location of the user is less than a predetermined value.

The cooperative positioning determining unit 133 may determine whether to perform cooperative positioning with a relative positioning device based on the calculated accuracy. For example, the relative positioning device may measure a movement direction and a movement distance of a terminal using an inertial sensor of the terminal, and the like. The relative positioning device may measure relative distance and direction from the terminal to a predetermined target. An absolute location of the target may be stored in the terminal or in an external database. An absolute coordinate of the target may be stored in the terminal or in the external database.

The cooperative positioning determining unit 133 may determine whether to perform the cooperative positioning based on the precise accuracy information 125 and relative location information, for example, by activating the relative positioning device when an average interval of the calculated accuracy is at least Z meters. The cooperative positioning determining unit 133 may determine to perform the cooperative positioning, for example, when the accuracy of the third location of the user is at least Z meters. The relative location information indicates information about the target or the user measured by the relative positioning device.

For example, the cooperative positioning determining unit 133 may determine whether to perform the cooperative positioning based on the precise accuracy information 125 and the relative location information, by activating the relative positioning device when a predetermined target is located within a region of the relative positioning device. In this example, the region corresponds to an area in which a relative location and direction, from the relative positioning device to the predetermined target, can be measured. By additionally performing the cooperative positioning using the relative positioning device, an accuracy of the estimated location of the user may be enhanced.

The cooperative positioning determining unit 133 may determine to perform the cooperative positioning based on the precise accuracy information 125 and the relative location information, for example, by continuously activating the relative positioning device. In some examples, the cooperative positioning determining unit 133 may perform verification and compensation with respect to the accuracy by performing the cooperative positioning regardless of the accuracy of the third location of the user.

The cooperative positioning performing unit 140 may estimate the location of the user. For example, the cooperative positioning performing unit 140 may estimate the location of the user based on the precise accuracy information 125 and relative location information measured by the relative positioning device. When the cooperative positioning determining unit 133 determines to perform the cooperative positioning, the cooperative positioning performing unit 140 may perform the cooperative positioning based on the precise accuracy information 125 and the relative location information.

The location updating unit 150 may update a location of a user that is in motion. For example, the location updating unit 150 may update a location of a user based on the positioning-associated information that is sensed within a predetermined discovery range centered on the estimated current location of the user, in response to an estimation of the location of the user in the location estimating unit 130 and the cooperative positioning performing unit 140.

Using the positioning-associated information sensed within the predetermined discovery range, the location updating unit 150 may stably update the location of the user in motion.

As an example, the location updating unit 150 may update the location of the user in motion in response to a request from the user. As another example, the location updating unit 150 may update the location of the user in motion periodically or at predetermined time intervals.

Figure 2:
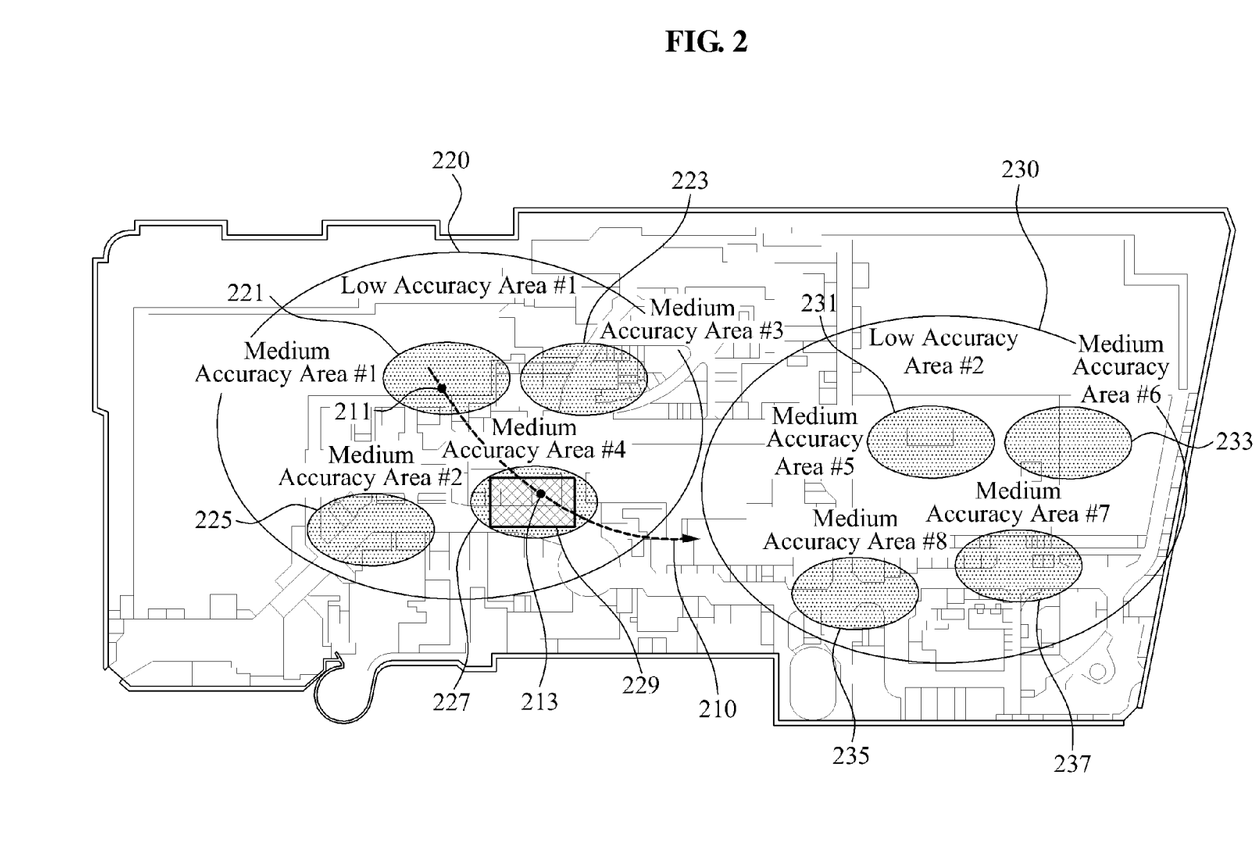
FIG. 2 is a diagram illustrating an example of estimating a location of a user.

FIG. 2 illustrates an example of estimating a location of a user using an apparatus for integrated positioning.

FIG. 2 illustrates a movement path 210 of the user. In this example, the user moves along a path from a location 211 to a location 213.

When the apparatus for integrated positioning initially estimates a location of the apparatus for integrated positioning at the location 211, the positioning information sensing unit 110 may sense positioning-associated information.

For example, the classification unit 120 shown in FIG. 1 may classify the positioning-associated information into low accuracy area #1 positioning-associated information 220 and medium accuracy area #1 positioning-associated information 221. In this example, the low accuracy area #1 positioning-associated information 220 includes medium accuracy area #1 positioning-associated information 221, medium accuracy area #2 positioning-associated information 225, medium accuracy area #3 positioning-associated information 223, and medium accuracy area #4 positioning-associated information 227.

The location estimating unit 130 may estimate a location of the user based on the low accuracy area #1 positioning-associated information 220, and may further estimate the location of the user based on the medium accuracy area #1 positioning-associated information 221.

As another example, when the apparatus for integrated positioning initially estimates a location of the apparatus for integrated positioning at the location 213, the positioning information sensing unit 110 may sense positioning-associated information.

For example, the classification unit 120 may classify the positioning-associated information into the low accuracy area #1 positioning-associated information 220, medium accuracy area #4 positioning-associated information 227, and precise accuracy positioning-associated information 229.

The location estimating unit 130 may estimate a location of the user based on the low accuracy area #1 positioning-associated information 220, may further estimate the location of the user based on the medium accuracy area #4 positioning-associated information 227, and may further estimate the location of the user based on the precise accuracy positioning-associated information 229 that has a relatively higher accuracy.

In this example, if an accuracy of the estimated location of the user is less than or equal to a predetermined value, the cooperative positioning performing unit 140 may estimate the location of the user through a cooperative performance with a relative positioning device.

As another example, the apparatus for integrated positioning may estimate a location of the user in motion using low accuracy area #2 positioning-associated information 230 that includes medium accuracy area #5 positioning-associated information 231, medium accuracy area #6 positioning-associated information 233, medium accuracy area #7 positioning-associated information 237, and medium accuracy area #8 positioning-associated information 235.

Figure 3:
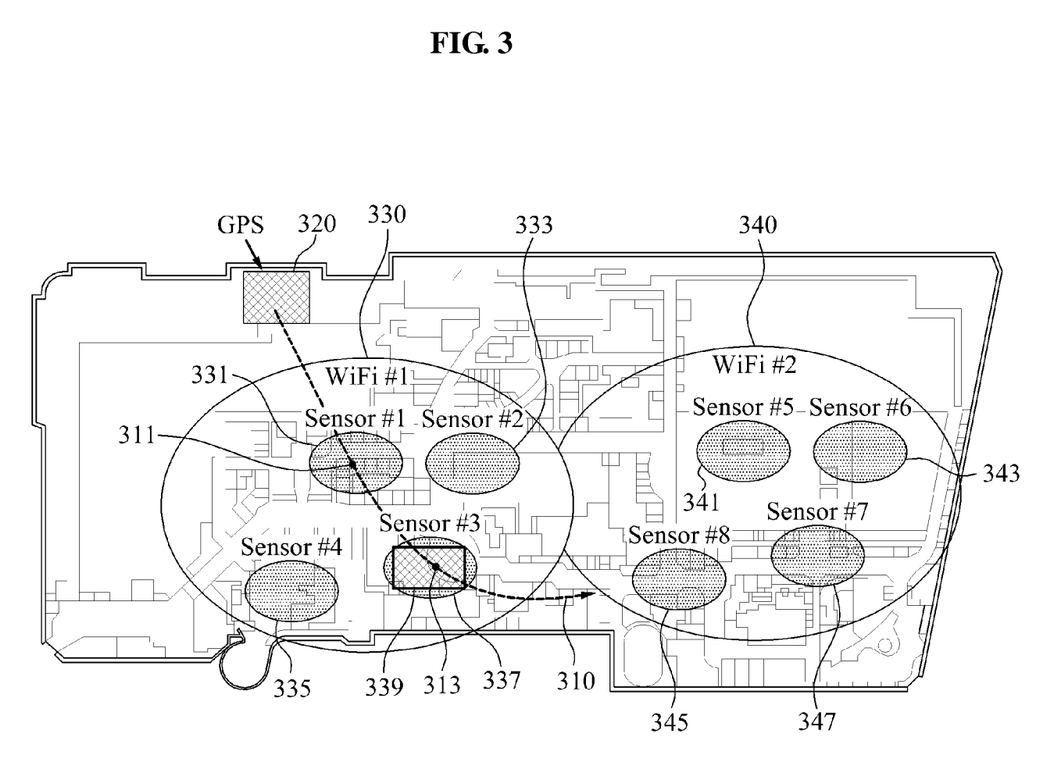
FIG. 3 is a diagram illustrating another example of estimating a location of a user.

FIG. 3 illustrates another example of estimating a location of a user using an apparatus for integrated positioning.

FIG. 3 illustrates a further example of FIG. 2 wherein low accuracy positioning-associated information may correspond to positioning-associated information obtained through Wi-Fi, and medium positioning-associated information may correspond to positioning-associated information obtained through a sensor.

FIG. 3 illustrates a movement path 310 of the user. In this example, the user moves along a path from a location 311 to a location 313.

The user may acquire information associated with location 320 using GPS information outside of a building. When the apparatus for integrated positioning initially estimates a location of the apparatus for integrated positioning at the location 311, the positioning information sensing unit 110 may sense positioning-associated information.

For example, the classification unit 120 may classify the positioning-associated information into Wi-Fi #1 positioning-associated information 330 and sensor #1 positioning-associated information 331. The Wi-Fi #1 positioning-associated information 330 may include the sensor #1 positioning-associated information 331, sensor #2 positioning-associated information 333, sensor #3 positioning-associated information 337, and sensor #4 positioning-associated information 335.

The location estimating unit 130 may estimate a location of the user based on the Wi-Fi #1 positioning-associated information 330, and may further estimate the location of the user based on the sensor #1 positioning-associated information 331.

When the apparatus for integrated positioning initially estimates a location of the apparatus for integrated positioning at the location 313, the positioning information sensing unit 110 may sense positioning-associated information.

For example, the classification unit 120 may classify the positioning-associated information into the Wi-Fi #1 positioning-associated information 330, the sensor #3 positioning-associated information 337, and precise accuracy positioning-associated information 339.

In this example, the location estimating unit 130 may estimate a location of the user based on the Wi-Fi #1 positioning-associated information 330, may estimate the location of the user based on the sensor #3 positioning-associated information 337, and may further estimate the location of the user based on the precise accuracy positioning-associated information 339 that has a relatively higher accuracy. If an accuracy of the estimated location of the user is less than or equal to a predetermined value, the cooperative positioning performing unit 140 may further estimate the location of the user through a cooperative performance with a relative positioning device.

As another example, the apparatus for integrated positioning may estimate a location of the user in motion using Wi-Fi

2 positioning-associated information 340 that includes sensor #5 positioning-associated information 341, sensor #6 positioning-associated information 343, sensor #7 positioning-associated information 347, and sensor #8 positioning-associated information 345.

Figure 4:
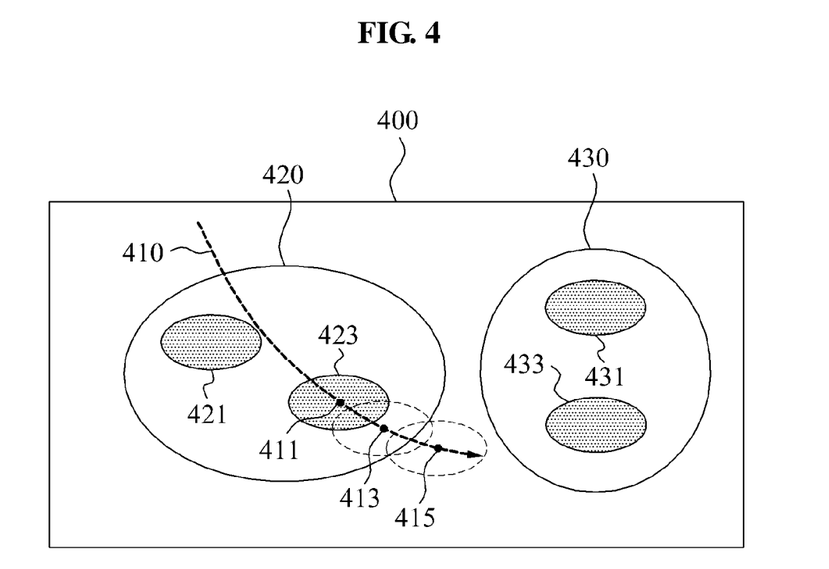
FIG. 4 is a diagram illustrating an example of an updating process of an apparatus for integrated positioning.

FIG. 4 illustrates an example of an updating process of an apparatus for integrated positioning.

FIG. 4 illustrates a movement path 410 of the user viewed from a building 400. In this example, the user moves along a path from a location 411 to a location 413, and to a location 415.

The building 400 may have low accuracy area #1 positioning-associated information 420 and low accuracy area #2 positioning-associated information 430. In this example, the low accuracy area #1 positioning-associated information 420 includes medium accuracy area #1 positioning-associated information 421 and medium accuracy area #2 positioning-associated information 423, and the low accuracy area #2 positioning-associated information 430 includes medium accuracy area #3 positioning-associated information 431 and medium accuracy area #4 positioning-associated information 433.

When the location 411 of the user is estimated based on positioning-associated information by the location estimating unit 130 or the cooperative positioning performing unit 140, and the user moves to the location 413, the location updating unit 150 may sense positioning-associated information within a predetermined discovery range that is centered at about the location 413, and may update the location of the user. For example, the location updating unit 150 may update the location based on the low accuracy area #1 positioning-associated information 420 and the medium accuracy area #2 positioning-associated information 423.

When the user moves to the location 415, the location updating unit 150 may sense positioning-associated information within a predetermined discovery range that is centered at about the location 415, and may update the location of the user. For example, the location updating unit 150 may update the location based on the low accuracy area #1 positioning-associated information 420.

Figure 5:
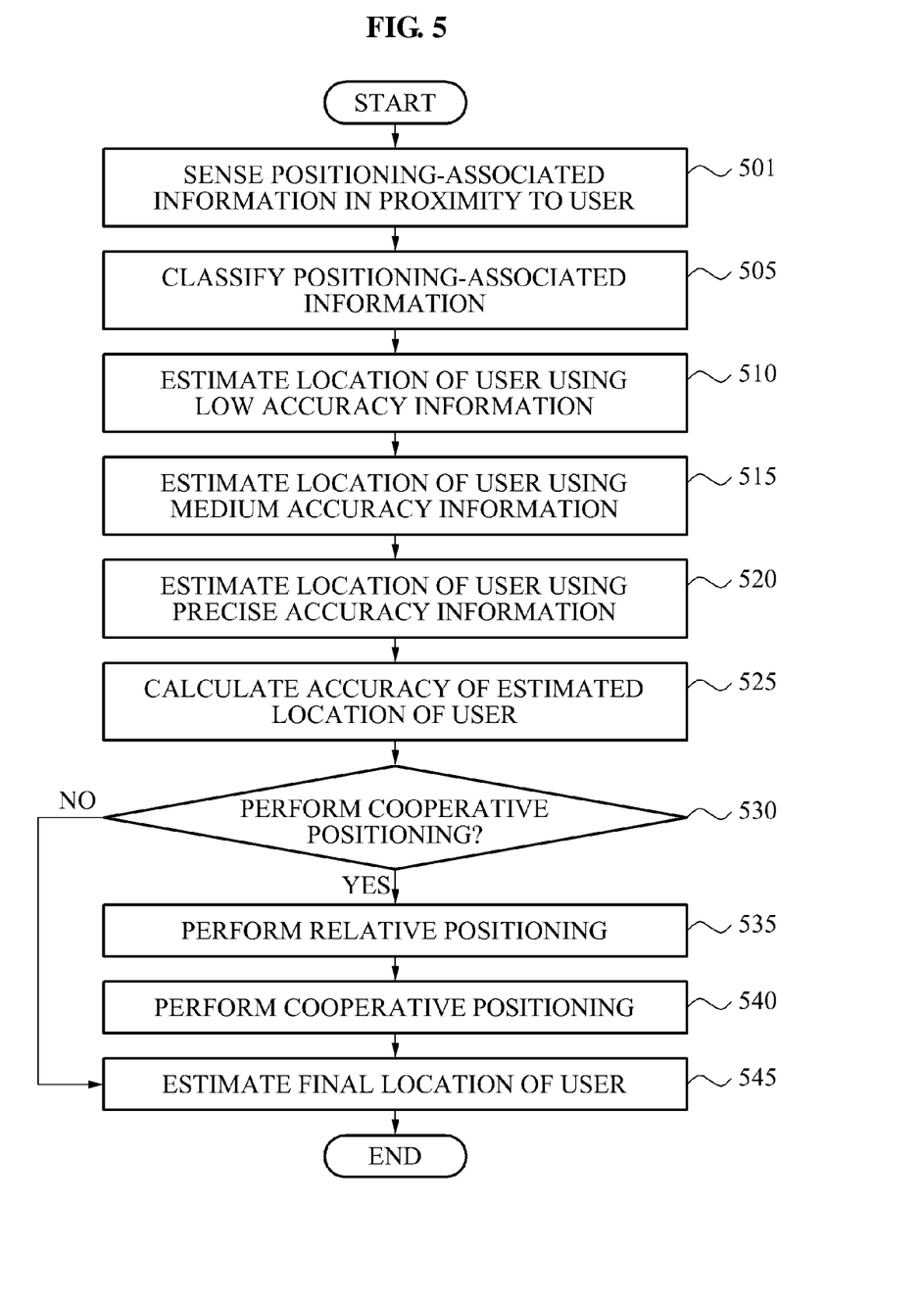
FIG. 5 is a flowchart illustrating an example of a method for integrated positioning.

FIG. 5 illustrates an example of a method for integrated positioning.

In 501, an apparatus senses positioning-associated information, in proximity to a user, to estimate a location of the user.

In 505, the apparatus classifies the sensed positioning-associated information into hierarchical classes of accuracy, for example, low accuracy information, medium accuracy information, and precise accuracy information based on a predetermined criterion.

In 510, the apparatus estimates the location of the user based on the low accuracy information among pieces of the classified positioning-associated information.

In 515, the apparatus estimates the location of the user based on the medium accuracy information among pieces of the classified positioning-associated information.

In 520 the apparatus estimates the location of the user based on the precise accuracy information among pieces of the classified positioning-associated information.

The low accuracy information may provide a location accuracy of an average of at least an X meter radius, the medium accuracy information may provide a location accuracy of an average of a Y meter radius, the precise accuracy information may provide a location accuracy of an average of a Z meter radius, and a value of X is greater than a value of Y, and a value of Y is greater than a value of Z.

For example, the apparatus may estimate a first location of the user based on the low accuracy information. Thereafter, the apparatus may estimate a second location of the user based on the medium accuracy information within an area in which the location estimating unit provides the low accuracy information. Thereafter, the apparatus may estimate a third location of the user based on the precise accuracy information within an area in which the location estimating unit provides the medium accuracy information.

In 525, the apparatus calculates an accuracy of the estimated third location of the user. The third location of the user may correspond to a location of the user estimated based on precise accuracy positioning-associated information.

In 530, the apparatus determines whether to perform cooperative positioning with a relative positioning device based on the calculated accuracy.

For example, the apparatus may determine whether to perform the cooperative positioning, based on the precise accuracy information and relative location information, by activating the relative positioning device when an average interval of the calculated accuracy is at least Z meters.

As another example, the apparatus may determine whether to perform the cooperative positioning, based on the precise accuracy information and relative location information, by activating the relative positioning device when a predetermined target is located within a relative region of the relative positioning device.

As another example, the apparatus may determine to perform the cooperative positioning based on the precise accuracy information and relative location information by continuously activating the relative positioning device.

In 535, in response to determining to perform cooperative positioning, the apparatus performs relative positioning using a relative positioning device. For example, the relative positioning device may measure a movement direction and a movement distance of a terminal using an inertial sensor of the terminal. The relative positioning device may measure a relative distance and direction from the terminal to a predetermined target.

In 540, the apparatus performs the cooperative positioning based on the precise accuracy information and relative location information measured from the relative positioning device.

In 545, the apparatus estimates a final location of the user by performing the cooperative positioning. When the cooperative positioning is not performed in 530, the apparatus estimates, as the final location, the third location of the user estimated based on the precise accuracy information.

In some embodiments, the apparatus for integrated positioning according to an embodiment may update a location of the user in motion, based on the positioning-associated information within a predetermined discovery range centered on the estimated location of the user, in response to an estimation of the location of the user.

Various examples herein may be applied to a field of a location based service (LBS), and may be applied to a terminal based LBS and a robot based LBS.

As described in various examples, surrounding infrastructure and information of a user may be sensed depending on a place to determine a technology to be used for acquiring location information in a hierarchical manner, thereby enhancing an accuracy of a detection of a location of the user.

By determining a technology to be used for acquiring location information in proximity to a user in a hierarchical manner, a time taken for estimating initial location information may be reduced.

When an accuracy of a predetermined criterion is not satisfied, a cooperative positioning may be performed through a relative positioning device to enhance an accuracy with respect to a location of a user.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for integrated positioning, the apparatus comprising:
   a positioning information sensor configured to sense positioning-associated information that is in proximity to the apparatus, wherein the positioning-associated information is sensed using a plurality of different sensing technologies;
   a classifier configured to classify the sensed positioning-associated information into at least two types of information based on an accuracy, wherein the accuracy is based on a type of the plurality of different sensing technologies that are used to provide the positioning-associated information to the sensor; and
   a location estimator configured to estimate the location of the apparatus sequentially from the at least two types of information,
   wherein each of the at least two types of information indicates a different error range between the estimated location of the apparatus and an actual location of the apparatus.

2. The apparatus of claim 1, wherein the at least two types of information include first information, second information, and third information, and wherein the first information provides a location accuracy of an X meter radius, the second information provides a location accuracy of an average of a Y meter radius, the third information provides a location accuracy of an average of a Z meter radius, and a value of X is greater than a value of Y, and the value of Y is greater than a value of Z.

3. The apparatus of claim 2, wherein the location estimator is configured to estimate a first location of the apparatus based on the first information, estimate a second location of the apparatus based on the second information within an area of the first information, and estimate a third location of the apparatus based on the third information within an area of the second information.

4. The apparatus of claim 3, wherein the location estimator comprises:
   an accuracy calculator configured to calculate an accuracy of the estimated third location of the apparatus; and
   a cooperative positioning determiner configured to determine whether a cooperative positioning is to be performed with a relative positioning device, based on the calculated accuracy.

5. The apparatus of claim 4, wherein the cooperative positioning determiner is configured to determine whether to perform the cooperative positioning based on the third information and relative location information, by activating the relative positioning device when an average interval of the calculated accuracy is at least Z meters.

6. The apparatus of claim 4, wherein the cooperative positioning determiner is configured to determine whether to perform the cooperative positioning based on the third information and relative location information, by activating the relative positioning device when a predetermined target is located within a relative region of the relative positioning device.

7. The apparatus of claim 4, wherein the cooperative positioning determiner is configured to determine to perform the cooperative positioning based on the third information and relative location information, by continuously activating the relative positioning device.

8. The apparatus of claim 4, wherein the relative positioning device is configured to measure a movement direction and a movement distance of a terminal using an inertial sensor of the terminal.

9. The apparatus of claim 4, wherein the relative positioning device is configured to measure a relative distance and direction from a terminal to a predetermined target.

10. The apparatus of claim 1, further comprising:
a cooperative positioning performer configured to estimate the location of the apparatus based on the third information and relative location information measured from a relative positioning device.

11. The apparatus of claim 1, wherein the positioning-associated information comprises map information indicating a location of an access point (AP) used for measuring the location of the apparatus or a location of a sensor for sensing a radio frequency (RF) signal.

12. The apparatus of claim 1, wherein the positioning-associated information comprises geomagnetic-associated map information indicating geomagnetic-associated information of a building where the apparatus is located.

13. The apparatus of claim 1, further comprising:
a location updater configured to update a location of the apparatus in motion, based on the positioning-associated information within a predetermined discovery range centered on the estimated location of the apparatus, in response to an estimation of the location of the apparatus.

14. The apparatus of claim 1, wherein the location estimator is configured to estimate a first location of the apparatus based on a first sensing technology, estimate a second location of the apparatus based on a second sensing technology within an area sensed using the first sensing technology, and estimate a third location of the apparatus based on a third sensing technology within an area sensed using the second sensing technology.

15. A method of apparatus for integrated positioning, the method comprising:
sensing, using a sensor, positioning-associated information that is in proximity to the apparatus, wherein the positioning-associated information is sensed using a plurality of different sensing technologies;
classifying the sensed positioning-associated information into at least two types of information based on an accuracy, wherein the accuracy is based on a type of the plurality of different sensing technologies that are used to provide the positioning-associated information; and
estimating the location of the apparatus sequentially from the at least two types of information,
wherein each of the at least two types of information indicates a different error range between the estimated location of the apparatus and an actual location of the apparatus.

16. The method of claim 15, wherein the at least two types of information include first information, second information, and third information, and
wherein the first information provides a location accuracy of an average of an X meter radius, the second information provides a location accuracy of an average of a Y meter radius, the third information provides a location accuracy of an average of a Z meter radius, and a value of X is greater than a value of Y, and the value of Y is greater than a value of Z.

17. The method of claim 16, wherein the estimating comprises estimating a first location of the apparatus based on the first information, estimating a second location of the apparatus based on the second information within an area of the first information, and estimating a third location of the apparatus based on the third information within an area of the second information.

18. The method of claim 17, wherein the estimating comprises:
calculating an accuracy of the estimated third location of the apparatus; and
determining whether a cooperative positioning is to be performed with a relative positioning device based on the calculated accuracy.

19. The method of claim 18, wherein the determining comprises determining whether to perform the cooperative positioning based on the third information and relative location information, by activating the relative positioning device when an average interval of the calculated accuracy is at least Y meters.

20. The method of claim 18, wherein the determining comprises determining whether to perform the cooperative positioning based on the third information and relative location information, by activating the relative positioning device when a predetermined target is located within a relative region of the relative positioning device.

21. The method of claim 18, wherein determining comprises determining to perform the cooperative positioning based on the third information and relative location information, by continuously activating the relative positioning device.

22. The method of claim 18, further comprising:
estimating the location of the apparatus based on the third information and relative location information measured from the relative positioning device.

23. The method of claim 18, further comprising:
updating a location of the apparatus in motion, based on the positioning-associated information within a predetermined discovery range centered on the estimated location of the apparatus, in response to an estimation of the location of the apparatus.

24. An apparatus for integrated positioning, the apparatus comprising:
a positioning information sensor configured to sense positioning-associated information that is in proximity to a apparatus, wherein the position-associated information is sensed using a plurality of different sensing technologies;
a classifier configured to classify the sensed positioning-associated information into a plurality types of information based on an accuracy, wherein the accuracy is based on a type of the plurality of different sensing technologies that are used to provide the positioning-associated information to the sensor; and
a location estimator configured to estimate the location of the apparatus sequentially from the plurality types of information,
wherein each of the plurality types of information indicates a different error range between the estimated location of the apparatus and an actual location of the apparatus.

25. The apparatus of claim 24, wherein the location estimator is further configured to estimate the location of the apparatus based on increasing accuracy of the plurality types of information.

26. The apparatus of claim 24, wherein the plurality types of accuracy information includes a first information and a second information having a different accuracy than the first information.

* * * * *